(12) United States Patent
Chang

(10) Patent No.: US 9,367,170 B1
(45) Date of Patent: Jun. 14, 2016

(54) TOUCH PANEL AND DISPLAY DEVICE

(71) Applicant: SHENZHEN CHINA STAR OPTOELECTRONICS TECHNOLOGY CO., LTD., Shenzhen, Guangdong (CN)

(72) Inventor: Chun Kai Chang, Guangdong (CN)

(73) Assignee: SHENZHEN CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 14/416,581

(22) PCT Filed: Dec. 26, 2014

(86) PCT No.: PCT/CN2014/095067
§ 371 (c)(1),
(2) Date: Jan. 22, 2015

(30) Foreign Application Priority Data

Dec. 22, 2014 (CN) .......................... 2014 1 0810747

(51) Int. Cl.
*G06F 3/044* (2006.01)
*G06F 3/041* (2006.01)

(52) U.S. Cl.
CPC .............. *G06F 3/0416* (2013.01); *G06F 3/044* (2013.01); *G06F 2203/04103* (2013.01); *G06F 2203/04104* (2013.01); *G06F 2203/04112* (2013.01)

(58) Field of Classification Search
CPC ....... G06F 3/041; G06F 3/044; G06F 3/0416; G06F 3/03; G06F 3/03545; G06F 2203/04104; G06F 2203/04112; G06F 2203/04103
USPC .................................. 345/156–174, 204, 214; 178/18.01–18.06
See application file for complete search history.

(56) References Cited

U.S. PATENT DOCUMENTS

| | | | |
|---|---|---|---|
| 2008/0007539 A1* | 1/2008 | Hotelling | G06F 3/044 345/173 |
| 2011/0007030 A1* | 1/2011 | Mo | G06F 3/044 345/174 |
| 2013/0076689 A1* | 3/2013 | Li | G06F 3/044 345/174 |
| 2015/0109235 A1* | 4/2015 | Chae | G06F 3/0416 345/174 |

* cited by examiner

*Primary Examiner* — Alexander Eisen
*Assistant Examiner* — Abhishek Sarma
(74) *Attorney, Agent, or Firm* — Kirton McConkie; Evan R. Witt

(57) ABSTRACT

A touch panel includes a plurality of sensing lines disposed in a sensing area, a plurality of touch-controlling lines disposed in a touch-detecting area, and an extended sensing line. The plurality of sensing lines are used for generating sensing signals, and the plurality of touch-controlling lines are used for receiving touch-controlling signals. The plurality of touch-controlling lines are extended to the sensing area to form mutual capacitances. The sensing line stretches into the touch-detecting area as the extended sensing line, forming a mutual capacitance in the touch-detecting area. It decreases the dead areas effectively and makes the positioning of touches more accurate.

13 Claims, 5 Drawing Sheets

TOUCH PANEL AND DISPLAY DEVICE

BACKGROUND OF THE INVENTION

1. Field of the Invention

The present invention relates to display technology, and more specifically, to a touch panel and display device.

2. Description of the Prior Art

As technology evolves, touchscreens are gradually becoming more prevalent. A touchscreen comprises a touch panel overlapping a display panel. The display panel is capable of various display functions, whereas the touch panel is capable of identifying touch gestures on the touchscreen. A touchscreen is formed by layering the touch panel, comprising touch-controlling lines and sensing lines, on top of the display panel.

Please refer to FIG. 1. On a conventional single-layer touch panel, a sensing line 102 is between two touch-controlling lines 101, so to enable a single-layer multi-touch function.

The existing technology has, but not limited to, the following problem:

As shown in FIG. 1, given the fact that indium tin oxide (ITO) in the conventional single-layer touch panel has higher impedance, the touch-controlling line 101 cannot be thin. In other words, the touch-controlling line 101 is wider, so it accounts for a larger area of the single-layer touch panel. In addition, because all sensing lines 102 are between two touch-controlling lines 101, an effective touch-detecting area shrinks and a dead area incapable of detecting touches (the dash line rectangle) increases accordingly.

Therefore, a new technical solution is necessary to solve the abovementioned technical problem.

SUMMARY OF THE INVENTION

An object of the present invention is to provide a touch panel and a display device that is capable of decreasing the width of dead areas effectively.

According to the present invention, a touch panel comprises: a plurality of sensing lines, disposed in a sensing area, for generating sensing signals; a plurality of touch-controlling lines, disposed in a touch-detecting area for, receiving touch-controlling signals, the plurality of touch-controlling lines being extended to the sensing area to form mutual capacitances. The sensing line stretches into the touch-detecting area as an extended sensing line, forming a mutual capacitance in the touch-detecting area; wherein one end of the extended sensing line is connected to one end of the sensing line. The touch panel further comprises a direction touch-controlling line, installed between the extended sensing line and the touch-controlling line adjacent to the extended sensing line, forming mutual capacitance with the extended sensing line in the touch-detecting area.

In one aspect of the present invention, the direction touch-controlling line is a line extending along a column direction.

In another aspect of the present invention, the direction touch-controlling line is in the same shape as the extended sensing line.

According to the present invention, a touch panel comprises a plurality of sensing lines and a plurality of touch-controlling lines. The plurality of sensing lines are disposed in a sensing area, and used for generating sensing signals. The plurality of touch-controlling lines are disposed in a touch-detecting area, and are used for receiving touch-controlling signals, the plurality of touch-controlling lines being extended to the sensing area to form mutual capacitances. The sensing line stretches into the touch-detecting area as an extended sensing line, forming a mutual capacitance in the touch-detecting area.

In one aspect of the present invention, the touch panel further comprises a direction touch-controlling line, installed between the extended sensing line and the touch-controlling line adjacent to the extended sensing line, forming mutual capacitance with the extended sensing line in the touch-detecting area.

In another aspect of the present invention, one end of the extended sensing line is connected to one end of the sensing line.

In still another aspect of the present invention, the direction touch-controlling line is a line extending along a column direction.

In yet another aspect of the present invention, the direction touch-controlling line is in the same shape as the extended sensing line.

According to the present invention, a display device comprises a display panel and a touch panel thereon. The touch panel comprises a plurality of sensing lines and a plurality of touch-controlling lines. The plurality of sensing lines are disposed in a sensing area, and used for generating sensing signals. The plurality of touch-controlling lines are disposed in a touch-detecting area, and are used for receiving touch-controlling signals, the plurality of touch-controlling lines being extended to the sensing area to form mutual capacitances. The sensing line stretches into the touch-detecting area as an extended sensing line, forming a mutual capacitance in the touch-detecting area.

In one aspect of the present invention, the touch panel further comprises a direction touch-controlling line, installed between the extended sensing line and the touch-controlling line adjacent to the extended sensing line, forming mutual capacitance with the extended sensing line in the touch-detecting area.

In another aspect of the present invention, one end of the extended sensing line is connected to one end of the sensing line.

In still another aspect of the present invention, the direction touch-controlling line is a line extending along a column direction.

In yet another aspect of the present invention, the direction touch-controlling line is in the same shape as the extended sensing line.

Comparing to the prior art, the present invention installs an extended sensing line in a touch-detecting area (i.e. the dead area), forming mutual capacitance in the touch-detecting area, thus the dead area has mutual capacitance as well. It decreases the dead areas effectively and makes the positioning of touches more accurate.

These and other features, aspects and advantages of the present disclosure will become understood with reference to the following description, appended claims and accompanying figures.

DETAILED DESCRIPTION OF PREFERRED EMBODIMENTS

The following descriptions for the respective embodiments are specific embodiments capable of being implemented for illustrations of the present invention, and should not be construed as limiting the other specific embodiments of the present invention which are not described herein. The terms "a" or "an", as used herein, are defined as one or more than one.

The display panel of the present invention may be a Thin Film Transistor Liquid Crystal Display (TFT-LCD) or an Active Matrix Organic Light Emitting Diode (AMOLED) panel.

The present invention installs the extended sensing line in the touch-detecting area (i.e. the dead area), forming mutual capacitance in the touch-detecting area, thus the dead area has mutual capacitance. It leads to a smaller fluctuation of a corresponding linearity of the touch panel, making the positioning of touches more accurate.

To illustrate technical solutions of the present invention, embodiments are provided as follows.

The First Embodiment

Figure 1:
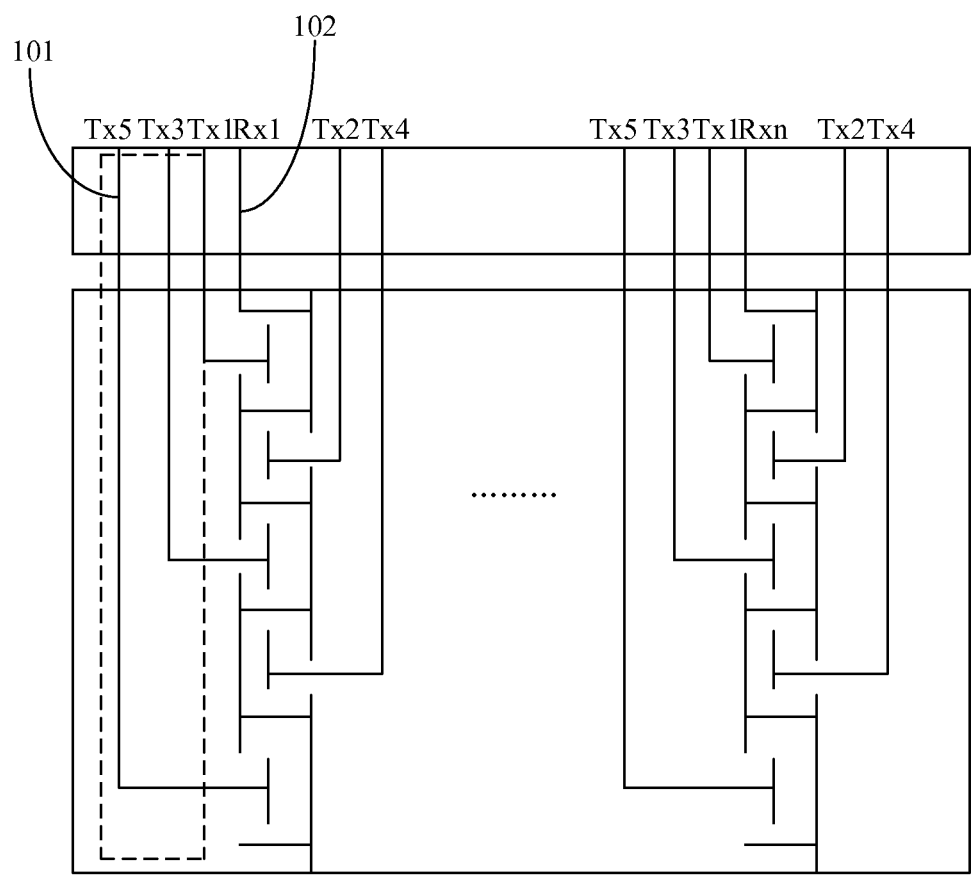
FIG. 1 shows a schematic diagram of a conventional touch panel.
Figure 2A:
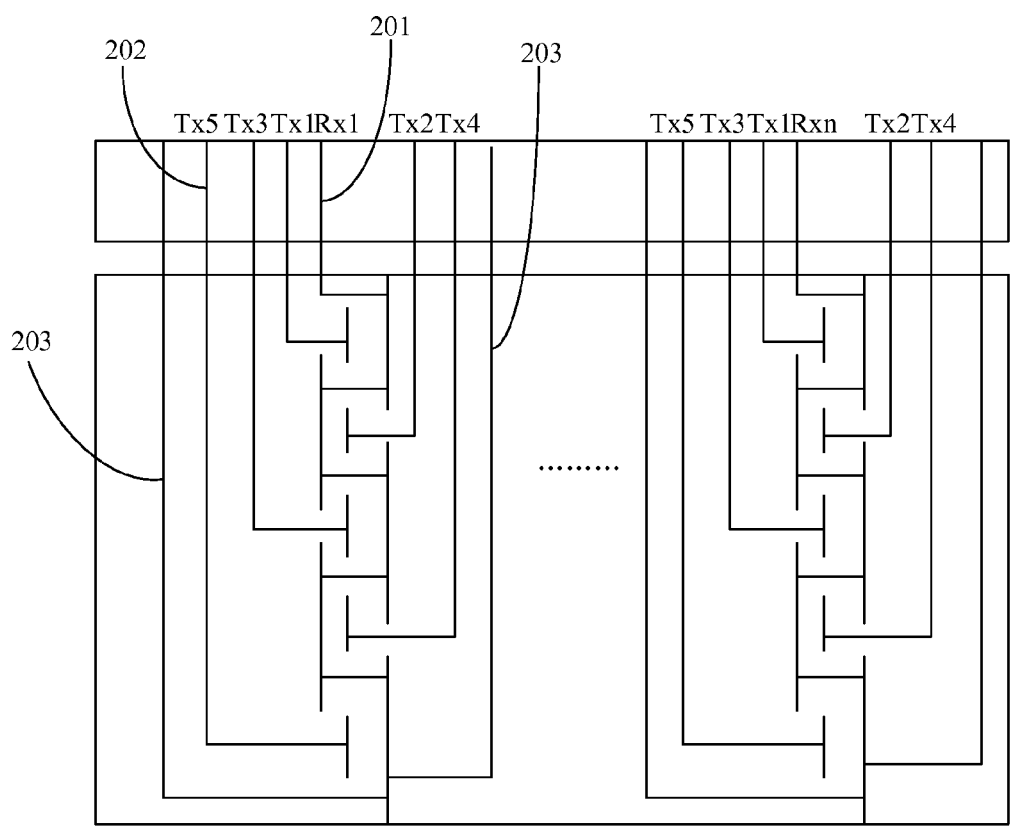
FIG. 2A shows a schematic diagram of the touch panel according to a first embodiment of the present invention.

Please refer to FIG. 2A, showing a schematic diagram of the touch panel according to a first embodiment of the present invention. For the convenience of explanation, only parts that are relevant to the present embodiment are shown.

The touch panel comprises a plurality of sensing lines 201 disposed in a sensing area to generate sensing signals, and a plurality of touch-controlling lines 202 disposed in the touch-detecting area to receive touch-controlling signals. Among them a plurality of touch-controlling lines 202 extends to the sensing area so to form mutual capacitance. The sensing line 201 extends into the touch-detecting area as an extended sensing line 203, forming mutual capacitance in the touch-detecting area. It effectively decreases the dead areas and therefore makes the positioning of touches more accurately.

In the present embodiment, the extended sensing line 203 is connected to one end of the sensing line 201.

The touch panel comprises a plurality of sensing areas, with each comprising a plurality of sensing lines 201, forming a plurality of semi-closed spaces. The semi-closed spaces are lined vertically, with an opening of each neighboring space facing opposite directions. The touch-controlling line 202 is embedded in the semi-closed spaces so to form mutual capacitance. The touch-controlling line 202 on the left is embedded in the semi-closed space with opening facing left, while the touch-controlling line 202 on the right is embedded in the semi-closed space with opening facing right. The advantage of the present design is that it increases effective touch-detecting areas.

Specifically, a semi-closed space is formed by three sensing lines 201, two in parallel and the other crossing them perpendicularly.

Figure 2B:
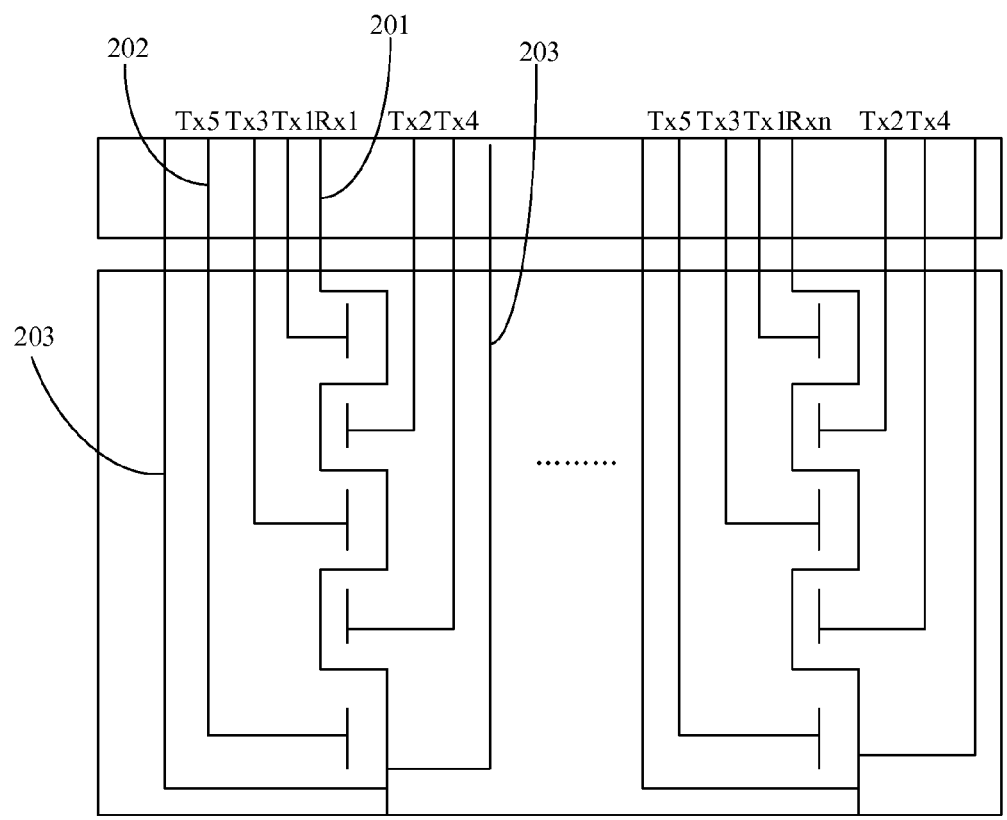
FIG. 2B shows another diagram of the touch panel according to a first embodiment of the present invention.

Please refer to FIG. 2B, showing another diagram of the touch panel according to a first embodiment of the present invention. The touch panel comprises a plurality of sensing areas, with each comprising a plurality of semi-closed spaces formed by one sensing line 201. The semi-closed spaces are lined vertically, with the opening of each neighboring space facing opposite directions. The touch-controlling line 202 is embedded in the semi-closed space so to form mutual capacitance. The touch-controlling line 202 on the left is embedded in the semi-closed space with opening facing left, while the touch touch-controlling line 202 on the right is embedded in the semi-closed space with opening facing right. The advantage of the present design is that it increases effective touch-detecting areas.

In the present embodiment, the touch-controlling line 202 comprises a first branch and a second branch. The first branch is in L-shape, with one end meeting the second branch perpendicularly. In the present embodiment, the second branch and part of the first branch are embedded into the semi-closed space formed by the sensing line 201 to form mutual capacitance. The advantage of the present design is that it increases effective touch-detecting areas.

In the present embodiment, the materials of the sensing line 201 and touch-controlling line 202 can be Indium Tin Oxide (ITO), metal mesh or graphene.

In the present embodiment, the sensing line 201 and touch-controlling line 202 form mutual capacitance. When the sensing line 201 and touch-controlling line 202 are pressed, they create different capacitances on different locations. Therefore the capacitance can be used to locate the position of a touch.

As illustrated above, the first embodiment installs extended sensing lines on both sides of a sensing area. The extended sensing line on the left forms mutual capacitance with a touch-controlling line TX5, and the extended sensing line on the right forms mutual capacitance with a touch-controlling line TX4. Therefore, it decreases the dead areas of the touch-controlling lines TX5 and TX4.

The Second Embodiment

Figure 3:
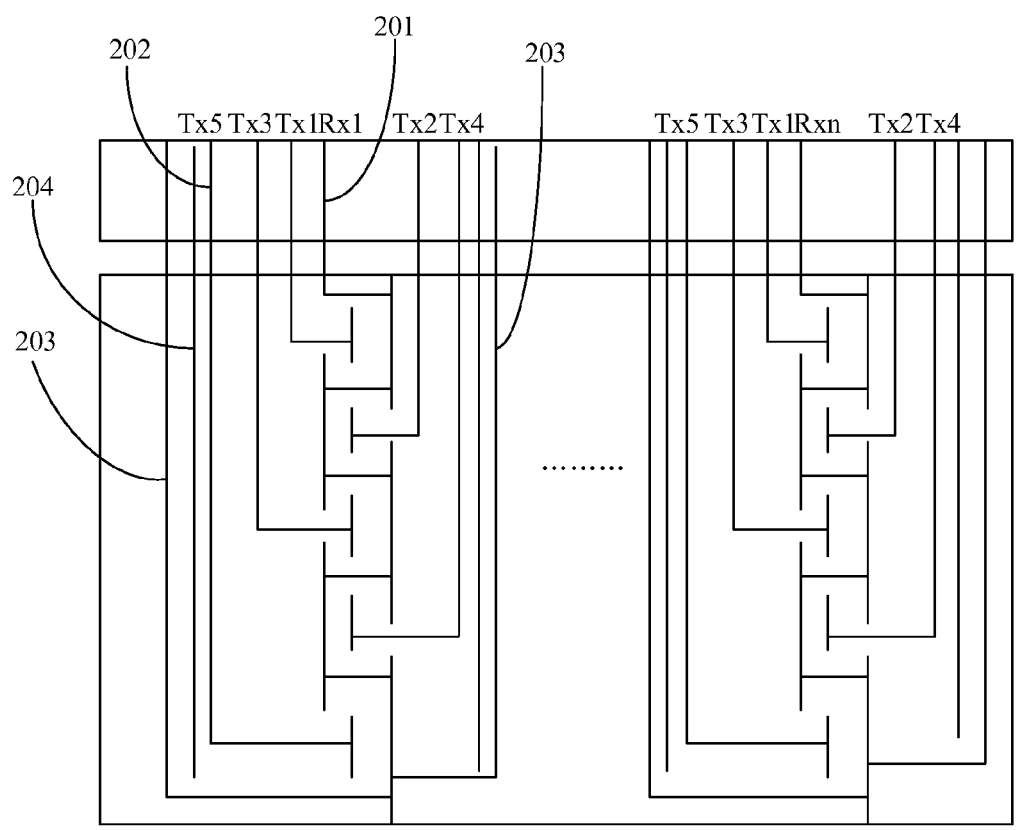
FIG. 3 shows a schematic diagram of the touch panel according to a second embodiment of the present invention.

Please refer to FIG. 3, showing a schematic diagram of the touch panel according to a second embodiment of the present invention. For the convenience of explanation, only parts that are relevant to the present embodiment are shown.

The second embodiment is similar to the first embodiment, but the difference is the touch panel of the second embodiment further comprises a direction touch-controlling line 204. It is installed between the extended sensing line 203 and the neighboring touch-controlling line 202, so to form mutual capacitance with the extended sensing line 203 in the touch-detecting area.

In the present embodiment, the direction touch-controlling line 204 is a line extending along a column direction. The line is installed between the extended sensing line 203 and the neighboring touch-controlling line 202, forming mutual capacitance with the extended sensing line 203 in the touch-detecting area.

In the present embodiment, the sensing line 201 and touch-controlling line 202 form mutual capacitance. When the sensing line 201 and touch-controlling line 202 are pressed, they create different capacitances on different locations. Therefore capacitances can be used to locate the position of a touch.

As illustrated above, the second embodiment installs the direction touch-controlling lines 204 between the extended sensing lines 203 and the neighboring sensing lines 202. The direction touch-controlling line 204 is a vertically positioned strait line. The extended sensing line on the left forms mutual capacitance with the direction touch-controlling line 204 on the left, and the extended sensing line on the right forms mutual capacitance with the direction touch-controlling line 204 on the right, thus decreases the dead areas.

The Third Embodiment

Figure 4:
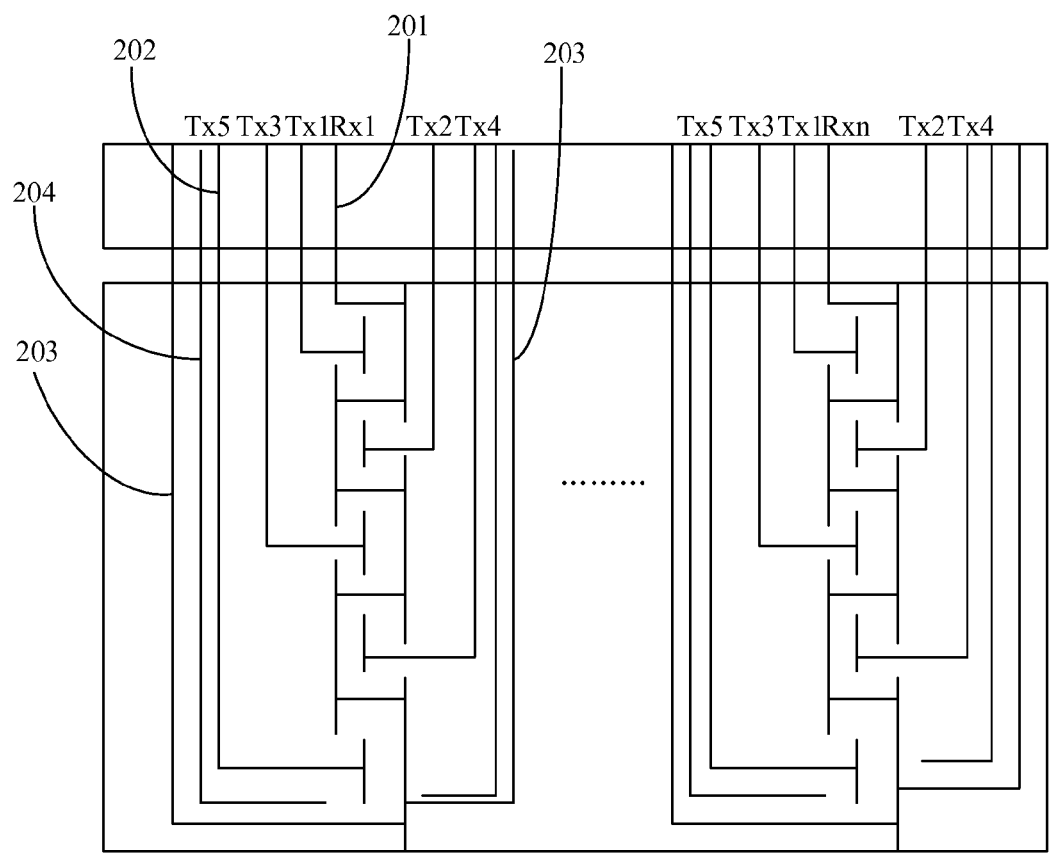
FIG. 4 shows a schematic diagram of the touch panel according to a third embodiment of the present invention.

Please refer to FIG. 4, showing a schematic diagram of the touch panel according to a third embodiment of the present invention. For the convenience of explanation, only parts that are relevant to the present embodiment are shown.

The third embodiment is similar to the first embodiment, but the difference is the touch panel of the third embodiment further comprises a direction touch-controlling line 204. It is installed between the extended sensing line 203 and the neighboring touch-controlling line 202, so to form mutual capacitance with the extended sensing line 203 in the touch-detecting area.

In the present embodiment, the direction touch-controlling line 204 and the extended sensing line 203 are both L-shaped. The L-shaped touch-controlling line 204 is installed between the extended sensing line 203 and the neighboring touch-controlling line 202, forming mutual capacitance with the extended sensing line 203 in the touch-detecting area. It effectively decreases dead areas.

In the present embodiment, the sensing line 201 and touch-controlling line 202 form mutual capacitance. When the sensing line 201 and touch-controlling line 202 are pressed, they create different capacitances on different locations. Therefore capacitance can be used to locate the position of a touch.

As illustrated above, the present embodiment installs the direction touch-controlling line 204 between the extended sensing line 203 and the neighboring touch-controlling line 202. The touch-controlling line 204 is in L-shape, with the short end of the "L" forming mutual capacitance with the extended sensing line. Thus it decreases the dead areas close to the lower edge of the touch screen.

The Fourth Embodiment

The present invention further proposes a display device. For the convenience of explanation, only parts that are relevant to the present embodiment are shown. The display device comprises a display panel and a touch panel thereon. The display panel displays images, and the touch panel identifies a contact on a surface of the touch panel.

The touch panel comprises a plurality of sensing lines 201 disposed in a sensing area to generate sensing signals, and a plurality of touch-controlling lines 202 disposed in the touch-detecting area to receive touch-controlling signals. Among them a plurality of touch-controlling lines 202 extends to the sensing area so to form mutual capacitance. The sensing line 201 extends into the touch-detecting area as an extended sensing line 203, forming mutual capacitance in the touch-detecting area. The touch panel further comprises a direction touch-controlling line 204. It is installed between the extended sensing line 203 and the neighboring touch-controlling line 202, so to form mutual capacitance with the extended sensing line 203 in the touch-detecting area. It effectively decreases the dead areas and therefore makes the positioning of touches more accurately.

In the present embodiment, the extended sensing line 203 is connected to one end of the sensing line 201.

In the present embodiment, the direction touch-controlling line 204 is a line extending along a column direction. The line is installed between the extended sensing line 203 and the neighboring touch-controlling line 202, forming mutual capacitance with the extended sensing line 203 in the touch-detecting area.

In the present embodiment, the direction touch-controlling line 204 and the extended sensing line 203 are both L-shaped. The L-shaped touch-controlling line 204 is installed between the extended sensing line 203 and the neighboring touch-controlling line 202, forming mutual capacitance with the extended sensing line 203 in the touch-detecting area.

In the present embodiment, the sensing line 201 and touch-controlling line 202 form mutual capacitance. When the sensing line 201 and touch-controlling line 202 are pressed, they create different capacitances on different locations. Therefore capacitance can be used to locate the position of a touch.

The present embodiment installs extended sensing lines on both sides of the sensing areas of the touch panel. The extended sensing line on the left forms mutual capacitance with the touch-controlling line TX5, and the extended sensing line on the right forms mutual capacitance with the touch-controlling line TX4. Therefore, it decreases the dead areas of the touch-controlling lines TX5 and TX4. The present embodiment also installs the direction touch-controlling line 204 between the extended sensing line 203 and the neighboring touch-controlling line 202. The direction touch-controlling line 204 is in L-shape, with the short end of the "L" forming mutual capacitance with the extended sensing line. Therefore it decreases the dead areas close to the lower edge of the touchscreen.

In summary, the touch panel and display device provided by the present invention install extended sensing lines in touch-detecting areas (i.e. dead areas). It forms mutual capacitances in the touch-detecting areas and dead areas, which are thus effectively decreased. Therefore, the fluctuation of a corresponding linearity of the touch panel is smaller, making the positioning of touches more accurate.

Moreover, despite one or more implementations relative to the present disclosure being illustrated and described, equivalent alterations and modifications will occur to others skilled in the art upon reading and understanding this specification and the annexed drawings. The present disclosure comprises such modifications and variations, and is to be limited only by the terms of the appended claims. In particular, regarding the various functions performed by the above described components, the terms used to describe such components (i.e. elements, resources, etc.) are intended to correspond (unless otherwise indicated) to any component, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such a feature may be combined with one or more other features of the other implementations as may be desired and advantageous for any given or particular application. Also, to the extent that the terms "including", "includes", "having", "has", "with", or variants thereof are used in the detailed description or in the claims, such terms are intended to be inclusive in a manner similar to the term "comprising".

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims, rather than the foregoing description and the exemplary embodiments described therein.

What is claimed is:
1. A touch panel, comprising:
    a plurality of sensing lines, disposed in a sensing area, for generating sensing signals;
    a plurality of touch-controlling lines, disposed in a touch-detecting area for, receiving touch-controlling signals, the plurality of touch-controlling lines being extended to the sensing area to form mutual capacitances;

wherein the sensing line stretches into the touch-detecting area as an extended sensing line, forming a mutual capacitance in the touch-detecting area; wherein one end of the extended sensing line is connected to one end of the sensing line;

a direction touch-controlling line, installed between the extended sensing line and the touch-controlling line adjacent to the extended sensing line, forming mutual capacitance with the extended sensing line in the touch-detecting area, wherein each sensing line comprises a plurality of horizontal portions and a plurality of vertical portions perpendicular to the plurality of horizontal portions, and one of the vertical portions is connected between two of the horizontal portions to form a sensing area, so that one of the touch-controlling lines extends in a position surrounded by the sensing area.

2. The touch panel of claim 1, wherein the direction touch-controlling line is a line extending along a column direction.

3. The touch panel of claim 1, wherein the direction touch-controlling line is in the same shape as the extended sensing line.

4. A touch panel, comprising:

a plurality of sensing lines, disposed in a sensing area, for generating sensing signals;

a plurality of touch-controlling lines, disposed in a touch-detecting area, for receiving touch-controlling signals, the plurality of touch-controlling lines being extended to the sensing area to form mutual capacitances;

wherein the sensing line stretches into the touch-detecting area as an extended sensing line, forming a mutual capacitance in the touch-detecting area, wherein each sensing line comprises a plurality of horizontal portions and a plurality of vertical portions perpendicular to the plurality of horizontal portions, and one of the vertical portions is connected between two of the horizontal portions to form a sensing area, so that one of the touch-controlling lines extends in a position surrounded by the sensing area.

5. The touch panel of claim 4 further comprising a direction touch-controlling line, installed between the extended sensing line and the touch-controlling line adjacent to the extended sensing line, forming mutual capacitance with the extended sensing line in the touch-detecting area.

6. The touch panel of claim 4, wherein one end of the extended sensing line is connected to one end of the sensing line.

7. The touch panel of claim 5, wherein the direction touch-controlling line is a line extending along a column direction.

8. The touch panel of claim 5, wherein the direction touch-controlling line is in the same shape as the extended sensing line.

9. A display device comprising a display panel and a touch panel thereon, the touch panel comprising:

a plurality of sensing lines, disposed in a sensing area, for generating sensing signals;

a plurality of touch-controlling lines, disposed in a touch-detecting area, for receiving touch-controlling signals, the plurality of touch-controlling lines being extended to the sensing area to form mutual capacitances;

wherein the sensing line stretches into the touch-detecting area as an extended sensing line, forming a mutual capacitance in the touch-detecting area, wherein each sensing line comprises a plurality of horizontal portions and a plurality of vertical portions perpendicular to the plurality of horizontal portions, and one of the vertical portions is connected between two of the horizontal portions to form a sensing area, so that one of the touch-controlling lines extends in a position surrounded by the sensing area.

10. The display device of claim 9, wherein the touch panel further comprises a direction touch-controlling line, installed between the extended sensing line and the touch-controlling line adjacent to the extended sensing line, forming mutual capacitance with the extended sensing line in the touch-detecting area.

11. The display device of claim 9, wherein one end of the extended sensing line is connected to one end of the sensing line.

12. The display device of claim 10, wherein the direction touch-controlling line is a line extending along a column direction.

13. The display device of claim 10, wherein the direction touch-controlling line is in the same shape as the extended sensing line.

* * * * *